United States Patent [19]

King et al.

[11] 3,900,527

[45] *Aug. 19, 1975

[54] PRODUCTION OF BASIC DYEABLE POLYESTER FROM TEREPHTHALIC ACID

[75] Inventors: Henry L. King; John W. McGee, both of Cary, N.C.

[73] Assignee: Monsanto Company, St. Louis, Mo.

[ * ] Notice: The portion of the term of this patent subsequent to Aug. 12, 1992, has been disclaimed.

[22] Filed: Apr. 16, 1973

[21] Appl. No.: 351,676

[52] U.S. Cl. ............................. 260/75 S; 260/75 M
[51] Int. Cl. ................................................ C08g 17/01
[58] Field of Search .................................. 260/75 S

[56] References Cited
UNITED STATES PATENTS

| 3,033,824 | 5/1962 | Huffman | 260/75 |
| 3,060,152 | 10/1962 | Ringwald | 260/75 |
| 3,636,131 | 1/1972 | Davis et al. | 260/75 |
| 3,639,352 | 2/1972 | Katsuura et al. | 260/75 |
| 3,725,348 | 4/1973 | Harrison et al. | 260/75 |

FOREIGN PATENTS OR APPLICATIONS

| 1,593,010 | 5/1970 | France |
| 1,952,735 | 7/1970 | Germany |

Primary Examiner—Melvin Goldstein
Attorney, Agent, or Firm—Thomas Y. Awalt, Jr.

[57] ABSTRACT

Fiber-forming cationic dyeable copolyesters are prepared noncontinuously by reacting a low molecular weight glycol-dicarboxylic acid prepolymer having a carboxyl concentration of not more than 2000μeq/g and an intrinsic viscosity of not more than 0.07 with a glycol solution of a bis glycol ester of a difunctional aromatic compound possessing one or more metallo sulfonate groups and of such concentration that the resulting glycol/dicarboxylic acid moiety ratio is at least about 1.6.

10 Claims, No Drawings

PRODUCTION OF BASIC DYEABLE POLYESTER FROM TEREPHTHALIC ACID

This invention relates to new and improved high molecular weight modified polyesters. More particularly this invention relates to fiber-forming modified polyesters having improved dyeability and affinity for basic dyes, and to methods for making said modified polyesters.

Polymeric linear polyesters are readily prepared by heating together dihydric alcohols or functional derivatives thereof and dibasic carboxylic acids or polyester-forming derivatives thereof such as acid halides, salts, or simple esters of volatile alcohols. Highly polymerized polyesters can be formed into filaments, fibers, films and the like which can be permanently oriented. The most widely known and most important commercially of the polymeric polyesters is that prepared by the condensation of terephthalic acid or dimethyl terephthalate and ethylene glycol. These polyester materials in drawn fiber or filament form cannot be satisfactorily dyed by the ordinary dyeing procedures used in dyeing cotton, wool, natural silk, and regenerated cellulose. It is recognized that unless the fiber-forming polyesters can be readily dyed by commercial dyeing processes, the utility of the polymer in the textile field will be limited. The compact structure of polyethylene terephthalate fibers, the molecules of which are closely packed along the axis of the fiber, makes it quite difficult, except with a limited number of dyes, and under extreme conditions of temperature and pressure, to obtain a satisfactory degree of dye-bath exhaustion, or to secure satisfactory deep shades in the fibers. Absorption and penetration of the dye into the fiber core are limited by inherent properties of the fiber.

A number of methods have been proposed to increase the dyeability of the polyesters and particularly polyethylene terephthalate. However, the methods proposed to date have not proved to be entirely satisfactory.

Modification of the polyesters by incorporating dye sites in the polymers by selected comonomers ordinarily does not produce satisfactory fiber-forming materials, i.e., the dye affinity may be enhanced but other physical properties such as tenacity, melting point and the like are adversely affected. Accordingly, the art has striven for means to increase the dyeability of polyester structures, such as fibers, filaments, films, and the like without adversely affecting other necessary physical properties.

One such method used successfully to improve the dye affinity of polyesters for dispersed acetate dyes and basic dyes is to conduct the polyester reaction in the presence of a small amount of a difunctional agent which possesses a metallo sulfonate group or sulfonate-forming group and two functional or reactive groups such as hydroxyl or carboxyl and esters thereof. By this novel technique modified polyesters can be produced which not only possess improved dye affinity for dispersed acetate dyes and may be dyed with basic dyes under temperature and pressure or with carriers, but also, the modified polyesters have the necessary molecular weight required for fiber-forming polyesters and excellent physical properties in fiber form. However it has been found that when starting with terephthalic acid and ethylene glycol such modification of polyesters often fails to produce satisfactory fiber-forming materials. Attempts to conduct the esterification reaction of terephthalic acid and ethylene glycol in the presence of such sulfonate-containing compounds, as, for example, 5-sodium sulfo isophthalic acid has resulted in excessive diethylene glycol formation, resulting in a polymer with a low melting point and poor heat and light stability in the fiber prepared therefrom.

It is an object of this invention to provide an improved method of non-continuously producing high molecular weight fiber-forming polyesters which have improved dyeing characteristics, including increased affinity for basic dye stuffs, which polyesters also have a useful balance of other desirable physical properties including high molecular weight, high melting point, and good heat and light stability.

Other objects and advantages of this invention will be apparent from the description thereof which follows.

The objects of this invention are accomplished by reacting continuously or non-continuously under polyesterification conditions an aromatic dicarboxylic acid and a polymethylene glycol to form a prepolymer having a carboxyl level of not more than 2000 $\mu$eq/g and an intrinsic viscosity of not more than 0.07 which is then reacted non-continuously with a glycol solution of a bis glycol ester of a difunctional aromatic compound possessing one or more metallo sulfonate groups and of such concentration that the resulting glycol/dicarboxylic acid moiety ratio is at least about 1.6. Excess glycol is removed and polymerization is completed in the usual manner. The polymer obtained is equivalent to polymers obtained using dimethyl terephthalate as a starting material, but does not contain the excessive diethylene glycol which otherwise results in the preparation of cationic dyeable polyesters starting from terephthalic acid.

Generally, the process for producing polyesters using the method of this invention comprises forming a reaction mixture comprising an aromatic dicarboxylic acid and excess of polymethylene glycol. Other additives, such as catalyst, chain branching agents, chain terminating agents and/or cross linking agents and the like may also be added with the initial ingredients if desired. The reaction mixture is heated to an elevated temperature sufficient to start the reaction between the acid and the glycol, with the elevated temperature being maintained until the reaction is substantially completed as indicated by the cessation of the evolution of the water of reaction, whereby a small amount of monomer and a predominate amount of oligomers and polymers of a low degree of polymerization are formed. During this stage of the reaction, the temperature must be such that the water formed is continuously removed by distillation. It may be desirable, although certainly not necessary, to conduct this stage of the reaction under a pressure of from about 5 psig to 100 psig in order to accelerate the reaction and produce a low molecular weight prepolymer. At a point when the degree of esterification of the prepolymer is greater than 80%, as indicated by a carboxyl level of not more than 2000 $\mu$eq/g (ordinarily at above 80% of esterification), and when the prepolymer has an intrinsic viscosity of not more than about 0.07, the preformed bis glycol ester of the sulfonate-containing compound is added in an amount and of such concentration that the resulting glycol/dicarboxylic acid moiety ratio is at least about 1.6. The temperature of the reaction mixture may be raised to remove excess glycol and to condense the resulting intermediate product to a highly polymerized polyester. A reduced pressure is generally applied to aid in removal of the remaining volatile constituent. The reaction preferably is carried out in an oxygen-free atmosphere.

The dicarboxylic acid employed is preferably terephthalic acid in view of its commercial availability at a relatively low cost and in view of the desirable properties of the polymer that can be produced by using this specific acid. Aromatic dicarboxylic acids which may be used in accordance with the present invention include those having the general formula

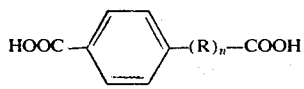

wherein $n$ is either zero or one, and R is a radical selected from the group consisting of (a) an alkylene radical containing 1 to 8 carbon atoms;

(b) 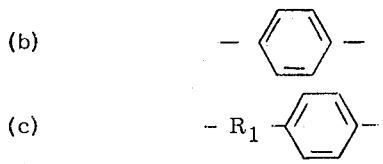

(c)

wherein $R_1$ is an alkylene group containing 1 to 8 carbon atoms;

(d) 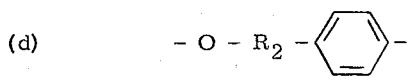

wherein $R_2$ is an alkylene group containing 1 to 8 carbon atoms; and (e) 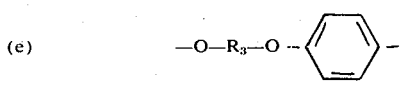

wherein $R_3$ is an alkylene group containing from 1 to 8 carbon atoms.

As examples of suitable aromatic p-dicarboxylic acids having the above general formulas there may be named: terephthalic acid; p,p'-dicarboxy diphenyl; p,p'-dicarboxydiphenylmethane; p,p'-dicarboxydiphenylethane; p,p'-dicarboxydiphenylpropane; p,p'-dicarboxydiphenylbutane; p,p'-dicarboxydiphenylpentane; p,p'-dicarboxydiphenylhexane; p,p'-dicarboxydiphenylheptane; p,p'-dicarboxydiphenyloctane; p,p'-dicarboxydiphenoxymethane; p,p'-dicarboxydiphenoxyethane; p,p'-dicarboxydiphenoxypropane; p,p'-dicarboxydiphenoxybutane; p,p'-dicarboxydiphenoxypentane; p,p'-dicarboxydiphenoxyhexane, and the like. Other useful aromatic dicarboxylic acids that may be used include naphthalene dicarboxylic acids such as 2,6-dicarboxynaphthalene, 2,7-dicarboxynaphthalene, and the like.

Copolyesters can also be prepared in accordance with the present invention. For example, mixtures of the aromatic p-dicarboxylic acids defined above or these acids mixed with up to 50 weight percent of an aromatic m-dicarboxylic acid such as isophthalic acid or xylidinic acid may be employed to make a polyester having particularly desirable physical properties. It is necessary that the sole reactive groups of the acid be the two carboxyl groups. Therefore, it will be appreciated that the aromatic dicarboxylic acid may contain substituents that do not enter into the polycondensation reaction. For example, durene, 1,4-dicarboxylic acid may be employed. The invention also includes processes as described above wherein polyesters can be prepared by replacing in part the aromatic dibasic carboxylic acid with up to 30 percent by weight of an aliphatic dicarboxylic acid, such as succinic acid, adipic acid, sebacic acid, alpha, alpha-dimethylglutaric acid, itaconic acid, beta-oxydipropionic acid, alpha, alpha-oxydibutyric acid, fumaric acid, and the like. Longer chain aliphatic dicarboxylic acids such as 1,20-eiconsanedioic acid, 8-ethyl-1,18-octadecanedioic acid, a mixture thereof, and the like may also be substituted in part for the aromatic dicarboxylic acid. For the purposes of this invention, "polyesters" will be considered to include at least 85% by weight of the ester of a dihydric alcohol and a dicarboxylic acid.

The polymethylene glycol employed in the process of the present invention may be any glycol containing 2 to 10 carbon atoms or polyester-forming derivatives thereof, and more preferably are polymethylene glycols of the general formula $HO(CH_2)_nOH$, wherein $n$ is an integer from 2 to 10 and cyclohexane dimethanol. Illustrative of suitable glycols that may be used for the purposes of this invention are ethylene glycol, 1,5-pentanediol, 1,3-propanediol, 1,6-hexanediol, 1,7-heptanediol, 1,8-octanediol, 1,9-nonanediol, 1,10-decanediol and the like. It is preferred that the glycol used be ethylene glycol.

At least about one molar proportion of the glycol per molar proportion of the acid is employed. However, a molar excess of the glycol is usually employed in the preparation of polyesters. Normally, from about 1.3 to 5 moles of glycol per mole of acid are used.

The sulfonate-containing compound of which the bis-ester is employed, is any organic compound containing at least one sulfonate group and capable of entering into a polyesterification reaction. The sulfonate-containing additive will react with the dicarboxylic acid and the polymethylene glycol prepolymer and will form an integral part of the polymer structure.

Illustrative of sulfonate-containing compounds which may be employed for the purposes of this invention are compounds of the formula

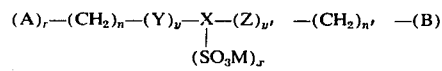

wherein

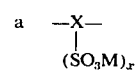

is a member of the class consisting of a metallic salt of a divalent arylene radical and a metallic salt of a divalent alkylene radical, each being of such character that the — $SO_3M$ — groups present are separated from ester-forming units by at least 3 carbon atoms and $x$ is an integer of 1 to 2, b. Y and Z are selected from the group consisting of oxyalkyl, oxyaryl, oxyalkyleneoxyaryl and poly(oxypolymethylene) oxyaryl radicals and $y$ and $y'$ are integers of 0 to 1, c. $n$ and $n'$ are integers of 0 to 10, and d. A is a member selected from the ester-forming units COOH, COOR, and R representing a lower alkyl group of 1 to 6 carbon atoms, B is a member selected from the group consisting of A and hydrogen, and $r$ is an integer of 1 to 2, with the proviso that when $r$ is 2, then B must be hydrogen.

These compounds are well known in the prior art, and descriptions of such compounds may be found in U.S. Pat. Nos. 3,018,272; 3,033,824; 3,077,493; 3,164,566; 3,164,567, 3,164,570; 3,184,434, 3,166,531; and 3,185,671. Preferred is the bis glycol ester of 5-sodium sulfo isophthalic acid, which is prepared separately from dimethyl-5-sodium sulfo isophthalate and ethylene glycol or by esterification of 5-sodium sulfo isophthalic acid. The bis glycol ester is prepared as a solution in ethylene glycol and fed to the preformed acid glycol prepolymer as described above.

In the process of this discovery, attempts were made to prepare the cationic dyeable polyester polymer from terephthalic acid employing 5-potassium sulfoisophthalic acid or 5-sodium sulfo isophthalic acid. Such runs were not successful due to excessive side reactions in which diethylene glycol was produced. In all of such attempts, reactants were added as one charge to the esterification reactor. it should be noted that if dimethyl terephthalate were substituted for terephthalic acid, the cationic dyeable polymer could be prepared using the dimethyl ester of the metallo sulfo isophthalic acid.

Efforts were then made to minimize the side reaction to form diethylene glycol (DEG); and it was found that the addition of certain basic salts such as lithium acetate to the formulation greatly reduced DEG formation. Although these efforts were, for the most part, successful, other methods of successfully preparing the copolymer from terephthalic acid were desired, primarily because when basic salts were used to depress the formation of DEG, some cationic dyeability was lost.

Other attempts to minimize formation of diethylene glycol in preparing cationic dyeable polyesters using terephthalic acid included the use of esters such as dimethyl-5-potassium sulfo isophthalate in leu of the free acid, 5-potassium sulfo isophthalic acid in an attempt to lower DEG formation by using a less acidic reaction media during esterification, it being known the DEG formation is acid catalyzed. Not only were high levels of DEG generated, but a generally poor polymer was produced. Low melting point, poor spinning and drawing were noted.

The following examples were cited to illustrate the invention. They are not intended to limit it in any way.

EXAMPLE 1

The bis-glycol ester of 5-sodium sulfo isophthalic acid can be prepared from dimethyl 5-sodium sulfo isophthalate and ethylene glycol using lithium acetate and calcium acetate as ester interchange catalysts. A 900 ml. capacity auto clave was charged with 222 grams (0.75 mole) of dimethyl 5-sodium sulfo isophthalate, 372 grams (6.0 moles) of ethylene glycol, 0.60 grams of calcium acetate monohydrate, and 0.38 grams of lithium acetate dihydrate. The autocalve was heated to a temperature of 165°–210° C and methanol was collected by distillation during a period of 90 minutes. A small amount of ethylene glycol distilled along with the methanol. From the autoclave was obtained a 50% solution of the bis glycol ester of 5-sodium sulfo isophthalic acid in ethylene glycol. This solution was analyzed and found to have a carboxyl level of 9 $\mu$eq/g and a carboxylate level of 31 $\mu$eq/g. The 50% solution had a diethylene glycol (DEG) ethylene glycol (EG) weight ratio of 0.012, indicative of a low level of DEG.

This EG solution of the bis glycol ester of 5-sodium sulfo isophthalic acid exceeded the solubility limit and over a period of several days the solid bis glycol ester slowly precipitated. For storage over long periods of time it is advantageous to dilute the solution further with EG such that the final solution contains approximately 20–25% bis glycol ester.

While this example employs a mole ratio of ethylene glycol to dimethyl-5-sodium sulfo isophthalate of 8 to 1, other mole ratios can be employed, so long as there is an excess of ethylene glycol. Ratios of 4:1 have been effectively employed. Any common esterinterchange catalyst may be used.

EXAMPLE 2

The bis glycol ester of 5-sodium sulfo isophthalic acid may also be prepared from 5-sodium sulfo isophthalic acid and ethylene glycol. A 900 ml capacity autoclave was charged with 201 grams (0.75 moles) of 5-sodium sulfo isophthalic acid, 450 grams (7.25 moles) of ethylene glycol, and 2.0 grams of lithium acetate dihydrate. The autoclave was heated and 111.6 gram of distillate was collected during a period of 75 minutes at a constant temperature of 230° C. The distillate was analyzed and found to contain an excess of the theoretically required amount of water for bis glycol ester formation. From the autoclave was obtained an ethylene glycol solution of the bis glycol ester of 5-sodium sulfo isophthalic acid containing 48% bis glycol ester. This solution had a carboxyl content of 16.6 $\mu$eq/g, indicative of almost complete conversion of the carboxylic acid to the bis glycol ester. This solution contained 2.64 weight percent diethylene-glycol. On standing, the solid bis glycol ester slowly precipitated from solution. Dilution of the original solution to a range of 20–25% solids prevents precipitation of the bis glycol ester.

In the above reaction, esterification was conducted at 200°C. Lower reaction temperatures may be employed in conjunction with longer reaction times. The lithium acetate is employed to suppress formation of diethylene glycol, and the amount employed is not critical.

Analysis of solid bis glycol ester isolated from this run revealed 39.88% carbon, 3.50% hydrogen, and 8.64% sulfur (theoretical prediction was C — 40.4%, H — 3.67% and S— 9.0%). The solid melted in the range of 155°–180°C and was found to have an average degree of polymerization of 1.30 by vapor phase osmometry (theory predicts 1.14). The average equivalent weight was found to be 185.6 (theory for monomer 178.15).

EXAMPLE 3

This example describes the preparation of a cationic dyeable polyester via a batch terephthalic acid (TA) process using an ethylene glycol (EG) solution of the bis glycol ester of 5-sodium sulfo isophthalic acid.

A reactor was charged with 162 grams terephthalic acid, 152 grams ethylene glycol, 0.10 grams of antimony glycoloxide, 1.97 grams of an alkoxy polyoxyalkalene glycol chain terminator having a general formula R—O[G—O]$_x$—H where R equal 14–15 and x equal 14, 0.02 grams pentaerythritol, and 0.04 grams lithium acetate. The mixture was esterified by heating for 90 minutes at a temperature of 240°C during which time water and ethylene glycol were continually removed. After completion of esterification 37.6 grams of a 24% solution in ethylene glycol of the bis glycol ester of 5-sodium sulfo isophthalic acid was added, the temperature increased to remove excess ethylene glycol and polymerization completed at a temperature of 280°C with a vacuum of less than 1 mm. The polymer obtained after 30 minutes polymerization time had a specific viscosity of 0.275, a DTA melting point of 250°C, and contained 0.65 weight percent diethylene glycol. The polymer was spun and drawn 5.1 times to a yarn of excellent whiteness. Microscopic examination revealed that no aggregates of the dye additive were present in the yarn. The fiber dyed to a dark shade with Sevron Blue 2G (CI Name: Basic Blue 22; (no CI number) cationic dye.

EXAMPLE 4–9

Two hundred gram portions of a prepolymer having an intrinsic viscosity of 0.07, a carboxyl level of 535 μeq/g, containing 0.35 weight % of diethylene glycol, and having an EG/TA moiety ratio of 1.33/, were heated to a melt in 900 ml capacity autoclaves and ethylene glycol solutions of the bis glycol ester of 5-sodium sulfo isophthalic acid added prior to completion of polymerization. The following results were obtained. equilibrate for 15 minutes before addition of the GSSI. The addition of the ethylene glycol increased the EG/TA moiety ratio above 1.35/1 and decreased the intrinsic viscosity. 38 grams of a 20% solution of the bis glycol ester of 5-sodium sulfo isophthalic acid was added to this adjusted prepolymer and polymerization completed. The resulting polymer was free of aggregates and spun and drew normally.

EXAMPLE 12

This example is intended to show that materials other than the bis glycol ester of 5-sodium sulfo isophthalic acid can be added to the preformed prepolymer. A 900 ml capacity autoclave was charged with 163 grams terephthalic acid, 154 grams ethylene glycol, 0.1 grams of antimony glycoloxide and 1.0 grams of lithium acetate dihydrate. Esterification to form low molecular prepolymer was performed as in Example 3. This prepolymer had an ethylene glycol-TA moiety ratio of 1.32/1. 1.97 grams of the same chain terminator as employed in Example 3 and 0.02 grams of pentaerythritol were dissolved in 37.6 grams of a 24% solution of the bis glycol ester of 5-sodium sulfo isophthalic acid. To this solution was added 2.3 grams of a 30% slurry of titanium dioxide in ethylene glycol and the resulting mixture slurried. This slurry was added, at 240°C, to the above prepolymer and polymerized completely as before.

The polymer obtained melted at 250°(DTA) and spun and drew well. Microscopic examination showed it to be free of aggregates and the titanium dioxide deluxtrant was well dispersed throughout the yarn.

| Ex. No. | Grams Bis Glycol Ester | Grams EG | Temp. at Addition | Resulting EG/TA Moiety Ratio | Results After Polymerizing |
| --- | --- | --- | --- | --- | --- |
| 4 | 9 | 28.6 | 230° | 1.92/1 | No aggregation Spun Well |
| 5 | 9 | 10 | 240° | 1.54/1 | Aggregated Not spinnable |
| 6 | 9 | 10 | 260° | 1.54/1 | Aggregated Not spinnable |
| 7 | 9 | 22.5 | 240° | 1.79/1 | No aggregation Spun Well |
| 8 | 9 | 16.3 | 240° | 1.66/1 | No aggregation Spun Well |
| 9(1) | 9 | 38 | 240° | 1.92/1 | Aggregated Not spinnable |

(1)In this Example the EG/TA moiety ratio was reduced from 1.38/1 to 1.15/1 by removal of additional EG under vacuum at 240°C prior to addition of the EG solution of bis glycol ester. At the time of reaction of the prepolymer with the bis glycol ester of 5-sodium sulfo isophthalic acid, the prepolymer had an intrinsic viscosity of 0.10 and a carboxyl level of 243 μ eq/g.

EXAMPLE 10

The composition described in example 3 was prepared continuously in an 8-liter capacity reactor. The product from the reactor had an intrinsic viscosity of 0.081, and a carboxyl level of 370μeq/g. 200 grams of this reactor product was heated to a melt in a 900 ml capacity autocalve and 38 grams of a 20% solution of the bis glycol ester of 5-sodium sulfo isophthalic acid in ethylene glycol added and polymerization completed. The polymer obtained was borderline in spinnability due to the presence of particles in the polymer melt.

EXAMPLE 11

Example 10 was repeated except that 15 ml of ethylene glycol was added to the prepolymer and allowed to

EXAMPLE 13

This example is intended to show that it is imperative that the bis glycol ester of 5-sodium sulfo isophthalic acid be added to the preformed prepolymer and not as part of the original charge. The present example the bis glycol ester, instead of being added to the prepolymer, was included in the original charge to the reactor. Polymerization to form a cationic dyeable polyester proceeded normally and no aggregation of dye additive was present. The bis glycol ester had entered into reaction with the terephthalic acid and ethylene glycol to form a true copolymer. This method of addition, however, was found to have one serious drawback. Large quantities of diethylene glycol (greater than 7 mole percent) were formed and yarn prepared melted at 214°C (DTA). This is a dramatic contrast with the 245°–250°C melting point obtained when adding the bis glycol ester after prepolymer formation.

By measuring specific viscosity ($\eta sp$) at 25°C at a given concentration (½–4%) of the prepolymer in a solvent having a molar ratio: 2phenol/1 trichlorophenol, the intrinsic viscosity ($\eta$) is then calculated using the relationship $$[\eta] = (\sqrt{2/c}) [\eta\ sp - 1\ n\eta_{rel}]^{1/2} \eta_{rel} = + \eta sp$$

As is well known in the art, the carboxyl end group concentration can be determined by titration of the prepolymer with potassium hydroxide. Ethylene glycol/terephthalatic acid molar ratios can be determined, as is well known in the art, by material balance.

DEG is determined by gas chromatographic analysis after saponification of the polymer or prepolymer.

Melting points were determined from endotherms obtained with a DuPont Differential Thermal Analyzer.

The carboxyl concentration of 2000 $\mu$eq/g is roughly equivalent to a percentage of esterification of about 80. The theoretical lower limit on the intrinsic viscosity of the prepolymer which is suitable for the addition of the bis glycol ester of the difunctional aromatic compound possessing the sulfonate group is the intrinsic viscosity of a prepolymer consisting entirely of monomer. Such a prepolymer would not normally be obtained and the intrinsic viscosity would not normally be less than about 0.05. Ordinarily, an intrinsic viscosity of 0.05–0.07 will embrace prepolymers having a degree of polymerization of about 2 to 4. It must be appreciated that although the intrinsic viscosity of the prepolymer should not exceed .07, an equivalent process may employ a prepolymer of higher viscosity with subsequent depolymerization to an intrinsic viscosity of 0.07 or below, in the presence of the difunctional aromatic compound possessing the sulfonate group.

It is understood that changes and variations may be made in the present inventions without departing from the spirit and scope thereof as defined in the appended claims.

We Claim:

1. A method for producing fiber-forming modified polyesters non-continuously which comprises (1) forming a reaction product consisting of at least 85% by weight of the polyester of an aromatic dicarboxylic acid and a polymethylene glycol selected from the group consisting of those having the formula $HO(CH_2)_nOH$, wherein $n$ is an integer from 2 to 10, and cyclohexane dimethanol by reacting said acid and said glycol under esterification conditions until said reaction product has a carboxyl level of not more than 2000 $\mu$eq/g and an intrinsic viscosity of not more than 0.07; and (2) reacting with said reaction product a glycol solution of a bis glycol ester of a difunctional aromatic compound possessing a metallo sulfonate group of such concentration that when said bis glycol ester is mixed with said prepolymer, the resulting glycol/dicarboxylic acid moiety ratio is at least about 1.6; and copolymerizing and polycondensing said reactants at a temperature in the range of from about 65° C to about 325° C until the resulting polymer attains an intrinsic viscosity in the range of about 0.3 –0.8.

2. The method of claim 1 wherein said carboxyl level is about 500–900 $\mu$eq/g.

3. The method of claim 1 wherein the intrinsic viscosity of said prepolymer is about 0.07.

4. The method of claim 1 wherein the content of diethylene glycol in said prepolymer is about 0.60% DEG.

5. The method of claim 1 wherein the resulting glycol/dicarboxylic acid reaction product moiety ratio is about 1.33/1.

6. The method of claim 1 wherein said resulting glycol/dicarboxylic acid moiety ratio after addition of sulfonate containing additive is 1.66–1.92/1.

7. The method of claim 1 wherein said aromatic compound possessing a sulfonic acid group is 5-sodium sulfo isophthalic acid.

8. The method of claim 1 wherein said reaction product consisting of 85% by weight of the polyester of an aromatic dicarboxylic acid and polymethylene glycol is produced continuously starting with the dicarboxylic acid and the polymethylene glycol.

9. The method of claim 1 wherein the dicarboxylic acid is terephthalic acid.

10. The method of claim 1 wherein the glycol is ethylene glycol.

* * * * *

UNITED STATES PATENT OFFICE
CERTIFICATE OF CORRECTION

PATENT NO. : 3,900,527
DATED : August 19, 1975
INVENTOR(S) : Henry L. King and John W. McGee It is certified that error appears in the above-identified patent and that said Letters Patent are hereby corrected as shown below:

Example 4-9, Column 7 read:

> Two hundred gram portions of a prepolymer having an intrinsic viscosity of 0.07, a carboxyl level of 535 $\mu$eq/g, containing 0.35 weight % of diethylene glycol, and having an EG/TA moiety ratio of 1.33/, were heated to a melt in 900 ml capacity autoclaves and ethylene glycol solutions of the bis glycol ester of 5-sodium Example 4-9, Column 7 should read:

> Two hundred gram portions of a prepolymer having an intrinsic viscosity of 0.07, a carboxyl level of 535 $\mu$eq/g, containing 0.35 weight % of diethylene glycol, and having an EG/TA moiety ratio of 1.33/, were heated to a melt in 900 ml capacity autoclaves and ethylene glycol solutions of the bis glycol ester of 5-sodium sulfo isophthalic acid added prior to completion of polymerization. The following results were obtained.

Column 8, delete lines 1 and 2.

Column 8, line 33, "deluxtrant" should read ---delustrant---;

Signed and Sealed this twenty-fifth Day of November 1975

[SEAL]

Attest:

RUTH C. MASON
Attesting Officer

C. MARSHALL DANN
Commissioner of Patents and Trademarks